United States Patent [19]

Nakano et al.

[11] Patent Number: 4,766,505
[45] Date of Patent: Aug. 23, 1988

[54] METHOD AND APPARATUS FOR RECORDING VIDEO AND AUDIO SIGNALS IN SUCCESSIVE TRACKS ON A RECORD MEDIUM

[75] Inventors: Kenji Nakano, Ebina; Hisayoshi Moriwaki, Isehara, both of Japan

[73] Assignee: Sony Corporation, Tokyo, Japan

[21] Appl. No.: 111,107

[22] Filed: Oct. 20, 1987

Related U.S. Application Data

[63] Continuation of Ser. No. 904,832, Sep. 9, 1985, abandoned, which is a continuation of Ser. No. 767,676, Aug. 22, 1985, abandoned, which is a continuation of Ser. No. 444,522, Nov. 26, 1982, abandoned.

[30] Foreign Application Priority Data

Nov. 30, 1981 [JP] Japan .............................. 56-192139

[51] Int. Cl.$^4$ .......................... H04N 5/78; H04N 5/76
[52] U.S. Cl. ..................................... 360/19.1; 360/32; 358/343
[58] Field of Search ....................... 360/10.3, 9.1, 19.1, 360/32, 33.1; 358/144, 145, 343

[56] References Cited

U.S. PATENT DOCUMENTS

| | | | |
|---|---|---|---|
| 4,224,642 | 9/1980 | Mawatari et al. | 360/32 |
| 4,233,627 | 11/1980 | Sugihara | 358/143 |
| 4,353,098 | 10/1982 | Heinz et al. | 360/9.1 |
| 4,383,950 | 12/1981 | Taniguchi et al. | 360/10.3 X |
| 4,390,906 | 6/1983 | Furumoto et al. | 360/33.1 X |
| 4,404,602 | 9/1983 | Hoshimi et al. | 360/32 X |

FOREIGN PATENT DOCUMENTS

| | | | |
|---|---|---|---|
| 2027252 | 2/1980 | United Kingdom | 360/19.1 |
| 2059135 | 4/1981 | United Kingdom | 360/19.1 |
| 2075792 | 11/1981 | United Kingdom | 360/32 |
| 2092814 | 8/1982 | United Kingdom | 360/19.1 |

OTHER PUBLICATIONS

"Digital Video Recording-Some Experimentations & Future Considerations", Monzono et al., SMPTE Journal (Sep. 80), vol. 89, No. 9, pp. 658-662.

Primary Examiner—Aristotelis M. Psitos
Attorney, Agent, or Firm—Lewis H. Eslinger; Jay H. Maioli

[57] ABSTRACT

A method and apparatus for recording and reproducing an information signal comprised of a video signal and an audio signal in a plurality of successive parallel tracks on a magnetic tape, each track including a first audio section followed by a video section, by converting the audio signal into a PCM digital audio signal; compressing the PCM audio signal; frequency modulating the compressed PCM audio signal to produce an output PCM audio signal; and recording the output PCM audio signal and the video signal in the plurality of successive tracks such that one field interval of the video signal is recorded in the video section of each track and the output PCM audio signal corresponding to one field interval of the video signal is recorded in the audio section of each track and corresponds to the video signal in the leading portion of the previous successive track and the video signal in the trailing portion of the previous alternate track, wherein the audio signal recorded in each track is delayed by a maximum of 1.5 field intervals from the video signal to which it corresponds.

12 Claims, 7 Drawing Sheets

FIG. I
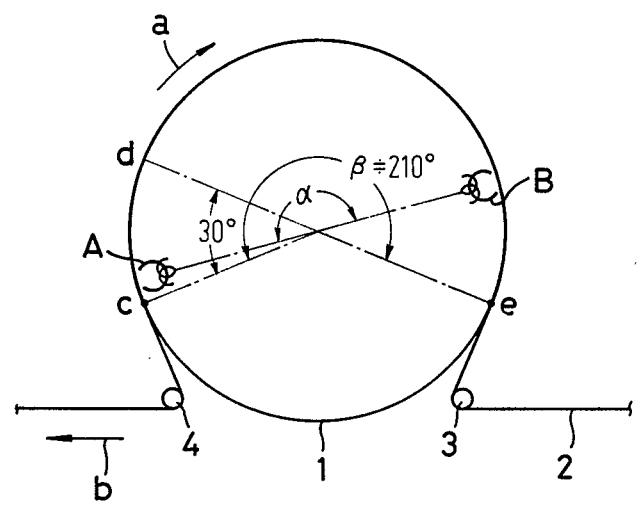
FIG. 2A
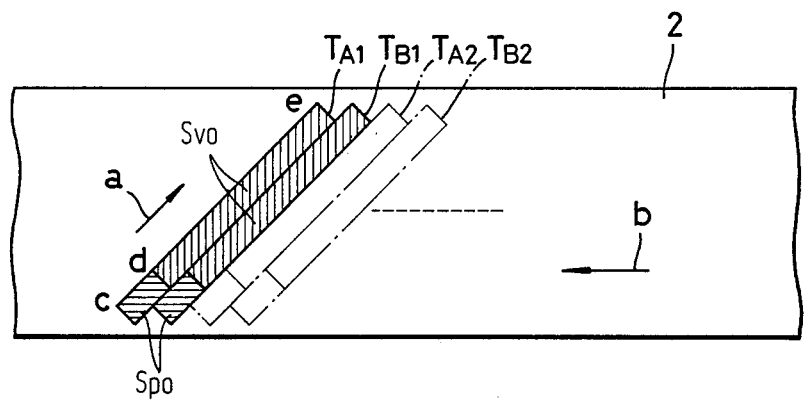

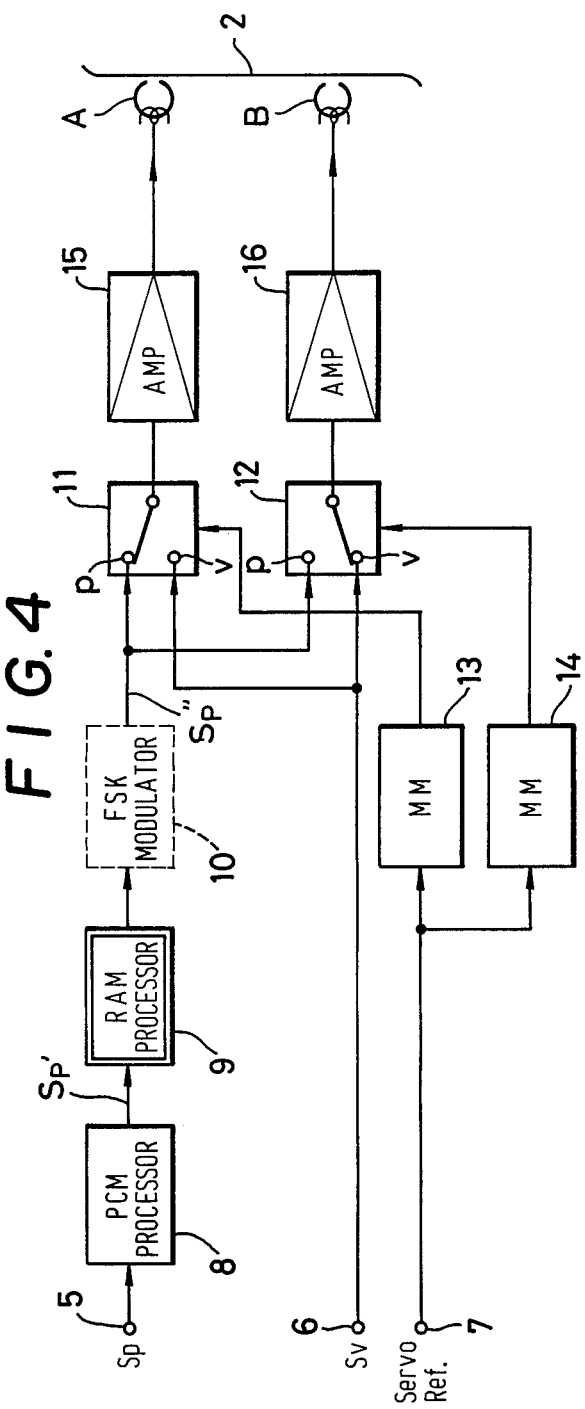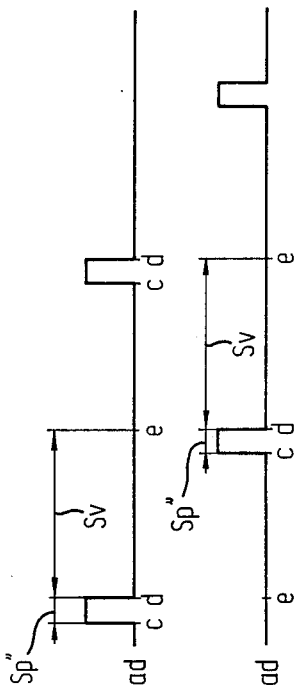

METHOD AND APPARATUS FOR RECORDING VIDEO AND AUDIO SIGNALS IN SUCCESSIVE TRACKS ON A RECORD MEDIUM

This is a continuation of application Ser. No. 904,832, filed Sept. 9, 1985, now abandoned, which was a continuation of application Ser. No. 767,676, filed Aug. 22, 1985, now abandoned, which was a continuation of application Ser. No. 444,522, filed Nov. 26, 1982, now abandoned.

BACKGROUND OF THE INVENTION

This invention relates generally to a method and apparatus for recording and reproducing an information signal and, more particularly, is directed to a method and apparatus for recording and reproducing a color television signal comprised of a video signal and an audio signal on a magnetic tape with a plurality of rotary magnetic heads.

Information signal recording and reproducing apparatus for recording and reproducing a video signal on a magnetic tape by means of a rotary magnetic head assembly are well known in the art. For example, in a helical scan type video tape recorder (VTR), at least one rotary magnetic head is rotated at a predetermined angle with respect to the longitudinal or tape running direction of a magnetic tape as the latter is advanced so as to form successive video tracks extending obliquely on the magnetic tape. With the helical scan type video tape recorder, it is possible to achieve high density recording of the video signal by advancing the magnetic tape at a slow running speed and, at the same time, providing a high relative speed between the magnetic head assembly and magnetic tape. However, with known helical scan type video tape recorders in which an audio signal is recorded and reproduced on an audio track extending in the longitudinal or tape running direction of the magnetic tape by a stationary magnetic head, there results a deterioration of the signal-to-noise (S/N) ratio and an increase in the wow and flutter when the speed of advancement of the magnetic tape is reduced. This, of course, results in a deterioration in the quality of the reproduced audio signal, causing the audio signal to have unsatisfactory quality when reproduced.

In order to overcome the aforementioned problem in the recording and reproducing of an audio signal by a stationary magnetic head, it has been proposed to effect the recording and reproducing of the audio signal by means of a rotary magnetic head. With this proposal, an overscan section is provided for each oblique track, for example, by increasing the tape winding angle about the guide drum assembly of the helical scan type video tape recorder. In this manner, each record track obliquely formed on the magnetic tape by the rotary magnetic head assembly includes a video track section and an audio track section, the latter of which corresponds to the aforementioned overscan section. The audio signal that is recorded and reproduced with respect to the audio track section of each track is processed as high density data obtained by processing the signal with a time axis or base compression and a time axis or base expansion.

In one known apparatus, two rotary magnetic heads are provided and are spaced apart by 180°. Thus, each head scans alternate ones of the successive tracks extending obliquely on the magnetic tape. It has been proposed to compress the audio signal and record the same in an overscan section at the beginning of each track with such known apparatus. It is to be appreciated, however, that a complete recording of the video signal must be performed before the audio signal is recorded in order to receive the entire audio signal and process the same prior to recording. If the two magnetic heads are designated as the A head and the B head, the timing of the A and B heads is such that, after the A head has completed recording the video signal in a first track, the B head just completes recording of the audio signal at the beginning of the next adjacent track. Thus, the audio signal corresponding to the video signal recorded by the A head must be recorded by the A head during the next scan of a track thereby. This means that the beginning of recording of the audio signal by the A head is delayed from the beginning of recording of the video signal corresponding thereto by approximately two field intervals, that is, one frame interval. As a result, a problem of lip synchronization occurs in which movement of an actor's lips is sufficiently advanced with respect to the sound corresponding to such movement so as to be noticeable.

It has also been proposed to record the audio signal in overscan sections at the end of each track. With this arrangement, after the A head has recorded one field interval of the video signal in a track, the B head records the compressed audio signal corresponding thereto at the trailing end of the next adjacent track. However, since the audio signal is recorded at the trailing end of each track, a delay equal to substantially two field intervals is again produced from the beginning of recording of the video signal by the A head to the time when the B head begins recording the audio signal corresponding thereto in the next adjacent track. As a result, the lip synchronization problem also results with this proposal.

OBJECTS AND SUMMARY OF THE INVENTION

Accordingly, it is an object of this invention to provide a method and apparatus for recording and reproducing an information signal that avoids the above-described difficulties encountered with the prior art.

More particularly, it is an object of this invention to provide a method and apparatus for recording and reproducing an information signal that substantially reduces the problem of lip synchronization.

It is another object of this invention to provide a method and apparatus for recording and reproducing an information signal comprised of a video signal and an audio signal such that the audio signal corresponding to each field interval of the video signal is delayed by a maximum of 1.5 field intervals therefrom.

In accordance with an aspect of this invention, a method of recording an information signal comprised of a video signal and an audio signal in a plurality of successive tracks on a record medium, each track being divided into at least two sections, includes the steps of converting the audio signal into digital form; compressing the digitized audio signal; and recording the compressed digitized audio signal and the video signal in the plurality of successive tracks such that one field interval of the video signal is recorded in at least one of the sections of each track and the compressed digitized audio signal corresponding to one field interval of the video signal is recorded in another section of each track and is delayed by a maximum of 1.5 field intervals from the video signal to which it corresponds.

In accordance with another aspect of this invention, apparatus for recording an information signal comprised of a video signal and an audio signal in a plurality of successive tracks on a record medium, each track being divided into at least two sections, includes means for converting the audio signal into digital form; means for compressing the digitized audio signal; and means for recording the compressed digitized audio signal and the video signal in the plurality of successive tracks such that one field interval of the video signal is recorded in at least one of the sections of each track and the compressed digitized audio signal corresponding to one field interval of the video signal is recorded in another section of each track and is delayed by a maximum of 1.5 field intervals from the video signal to which it corresponds.

The above, and other, objects, features and advantages of the present invention will become apparent from the following detailed description thereof which is to be read in connection with the accompanying drawings.

BRIEF DESCRIPTION OF THE DRAWINGS

FIG. 1 is a schematic plan view of a rotary magnetic head assembly for a helical scan type video tape recorder that can be used with the present invention;

FIG. 2A is a schematic plan view of a section of magnetic tape showing a known arrangement in which video and audio signals are recorded with the rotary magnetic head assembly of FIG. 1;

FIG. 4 is a block diagram of a recording section of an information signal recording and reproducing apparatus according to one embodiment of the present invention;

FIGS. 5A and 5B are timing charts used for explaining the operation of the switching circuits of FIG. 4;

DETAILED DESCRIPTION OF PREFERRED EMBODIMENTS

Figure 2B:
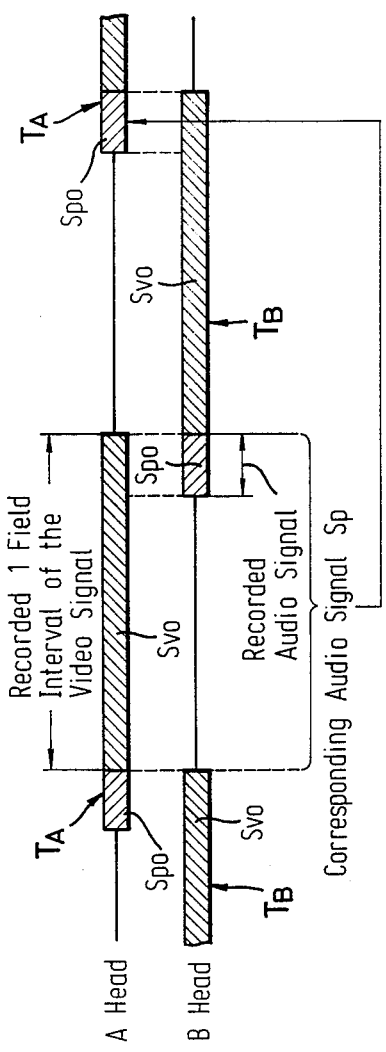
FIG. 2B is a timing chart illustrating the timing relationship for recording the video and audio signals on the magnetic tape of FIG. 2A.

Referring to the drawings in detail, and initially to FIG. 1 thereof, a rotary magnetic head assembly for recording the video and audio signals according to this invention includes two rotary magnetic heads A and B which are arranged to subtend an angle $\alpha$ of 180°, that is, the two rotary magnetic heads A and B are arranged in diametrically opposing relation to each other. The rotary magnetic head assembly includes a rotary guide drum 1 which is rotated at a constant speed in the direction of arrow a, and a magnetic tape 2 is helically wound about the outer periphery of rotary guide drum 1 so as to subtend an angle of approximately 220°. Magnetic tape 2 is advanced at a constant speed in the direction of arrow b by a tape drive system (not shown) comprised of a capstan and pinch roller and is guided about guide drum 1 by guide rollers or pins 3 and 4. During the recording operation, rotary magnetic heads A and B alternately trace record tracks $T_A$ and $T_B$, as shown, for example, in FIG. 2A. In this manner, each record track $T_A$ is used for recording video and audio signals in odd field intervals, while the remaining alternate record tracks $T_B$ are used for recording video and audio signals in even field intervals.

It is to be appreciated that, since the angle between rotary magnetic heads A and B is less than the angle subtended by the tape wound about the outer periphery of rotary guide drum 1, rotary magnetic heads A and B are simultaneously in contact with magnetic tape 2 during an overscan or overlap period. In particular, and referring to FIGS. 1 and 2, rotary magnetic heads A and B record the compressed audio signal $S_{po}$ in the first overscan section of alternate tracks during 30° rotation therof between points c and d of each track. It is to be appreciated that the angle between points c and d is shown in FIG. 1 to be greater than 30° merely to emphasize the overscan section and for ease of illustration in the drawings. During the next 180° rotation of each head between points d and e, one field interval of the video signal $S_{vo}$ is recorded in the same track following the previously recorded compressed audio signal. Thus, each head records the audio signal and video signal in respective tracks during rotation thereof of $\beta = 210°$. Since the heads are in contact with tape 2 for approximately 220°, each head is therefore in contact with the tape for an additional 5° prior to recording a track and an additional 5° after recording a track. It is to be appreciated that, during the latter 30° rotation of head A(B), head B(A) records the compressed digitized audio signal at the beginning of the next adjacent track, that is, during travel of head B(A) between points c and d. During this time, both heads are in contact with magnetic tape 2 to perform a recording operation.

With known information signal recording apparatus, the audio signal $S_{po}$ corresponding to the field interval of the video signal $S_{vo}$ recorded, for example, in track $T_{A1}$, can be recorded, at the earliest time, by the A head at the beginning of track $T_{A2}$. This is because the entire audio signal must be received prior to recording in order to digitize and compress the same. Thus, the audio signal $S_{po}$ corresponding to the video signal $S_{vo}$ recorded in track $T_{A1}$ can only be recorded after the video signal $S_{vo}$ is recorded in track $T_{A1}$. Since the B head records an audio signal $S_{po}$ at the beginning of track $T_{B1}$ while the A head is completing the recording operation of the video signal $S_{vo}$ in track $T_{A1}$ the next available recording of the audio signal $S_{po}$ corresponding to the video signal recorded in track $T_{A1}$ occurs at the beginning of track $T_{A2}$, as shown in FIG. 2B. As a result, the audio signal recorded in track $T_{A2}$ by the A head is delayed from the beginning of the corresponding video signal recorded in track $T_{A1}$ by approximately two field intervals, that is, one frame interval. Stated otherwise, the audio signal recorded in track $T_{A2}$ by the A head is delayed from the end of the corresponding video signal recorded in track $T_{A1}$ by one field interval. As a result of such time lag between the audio signal $S_{po}$ and the corresponding video signal $S_{vo}$, a lip synchronization problem arises in which movement of an actor's lips is advanced by a noticeable amount from the corresponding sound.

In accordance with another proposal, the compressed digitized audio signal is recorded at the trailing end of each track. In such case, an overlap period also occurs during recording of the audio signal in each track. With this latter proposal, the audio signal $S_{po}$ corresponding to the video signal $S_{vo}$ recorded in track $T_{A1}$, for example, is recorded by the B head at the trailing end of the next adjacent track $T_{B1}$. However, in this situation, a delay of approximately two field intervals, that is, one frame interval, also occurs between recording of the audio signal and the beginning of recording of the video signal corresponding thereto in the previous track. As a result, the same lip synchronization problem arises.

Figure 3:
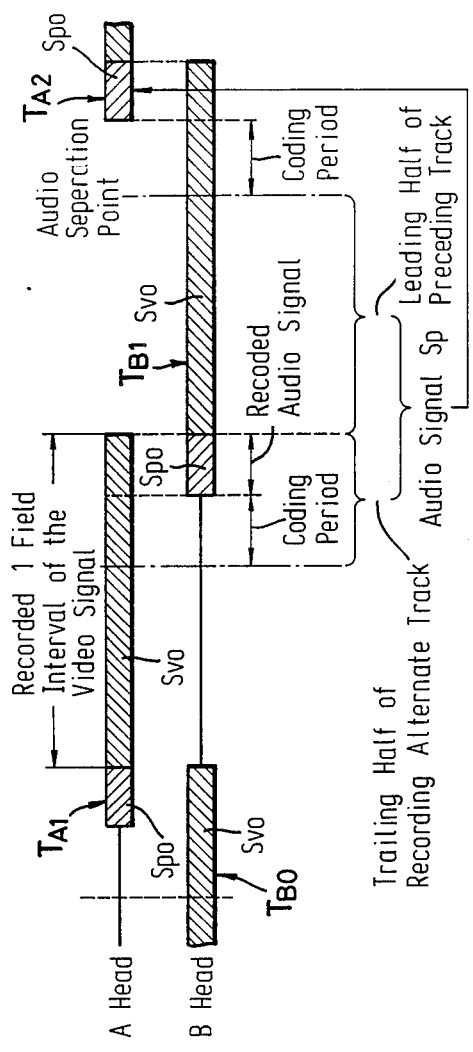
FIG. 3 is a timing chart illustrating the timing relationship for recording the video and audio signals on the magnetic tape of FIG. 2A in accordance with one embodiment of the present invention.

The object of the present invention is to reduce the delay between the audio signal and corresponding video signal to substantially reduce the problem of lip synchronization. In particular, the video signal in the trailing portion of each track and the video signal recorded in the leading portion of the next adjacent track are equivalent, in time, to one field interval of the video signal. The audio signal corresponding to this equivalent field time interval of the video signal is then recorded at the beginning of still the next adjacent track, as shown in Fig. 3. In one embodiment, the video signal in the trailing half of track $T_{A1}$ and the leading half of track $T_{B1}$ combine, in time to form one field interval of the video signal $S_{vo}$, and the audio signal $S_{po}$ corresponding thereto is recorded at the beginning of track $T_{A2}$. It should be appreciated that, in such case, the beginning of the audio signal $S_{po}$ recorded in track $T_{A2}$ is delayed from the beginning of the aforementioned equivalent field time interval of the video signal by slightly less than 1.5 field intervals. As a result, the problem of lip synchronization is substantially reduced.

It is to be further appreciated that the delay time between recording of the audio signal $S_{po}$ in track $T_{A2}$ from the beginning of the aforementioned equivalent field time interval of the video signal can be much less than 1.5 field intervals depending upon the period required for coding the audio signal $S_{po}$ prior to recording it in track $T_{A2}$. This is shown more particularly in FIG. 3 in which the trailing portion of track $T_{A1}$ that is chosen for the corresponding field interval in time is less than one-half of a field interval, while the leading portion of track $T_{B1}$ of the corresponding equivalent field interval is greater than one-half of a field time interval in time. In other words, if the combined interval of the overscan period for recording the audio signal $S_{po}$ in track $T_{A2}$ and the period for coding such audio signal is less than one-half of a field interval, the maximum delay time corresponding to the time between the beginning of the audio section and the beginning of the corresponding video section, can be selected much less than 1.5 field intervals. Stated otherwise, the delay time between the end of the audio section and the corresponding end of the video section is less than one-half of a field interval, determined by the period for recording the audio signal plus the period for coding the audio signal. Thus, as the period needed for coding the audio signal decreases, the audio separation point, that is, the point in time at the end of the corresponding leading portion of the video signal in track $T_{B1}$, moves to the right in FIG. 3 and reduces the separation period between the audio signal recorded in track $T_{A2}$ and the corresponding video signal recorded in tracks $T_{A1}$ and $T_{B1}$. The minimum delay would correspond to the case where no separation period exists, that is, where the audio signals are recorded in real time. This, of course, can not practically be performed. It is to be appreciated that the coding period is never so great that the maximum delay time is greater than 1.5 field intervals. Thus, with the present invention, delay between the audio signal and corresponding video signal is minimized and the problem of lip synchronization is significantly improved.

Referring now to FIG. 4, a block diagram of a recording section of an information signal recording and reproducing apparatus according to one embodiment of this invention includes a PCM processing circuit 8 supplied with an audio signal $S_p$ from an input terminal 5. As shown more particularly in FIG. 7, PCM processing circuit 8 includes an analog-to-digital (A/D) converting circuit 8a which converts the analog audio signal $S_p$ to a digital signal, and a PCM encoding circuit which encodes the digital signal to produce an encoded PCM audio signal $S_p'$ which, for example, may be an 8-bit digital signal. The encoded audio signal $S_p'$ is then supplied to a RAM processing circuit 9 which will be explained hereinafter in greater detail with respect to FIG. 7 and which provides a block of the encoded audio signal $S_p'$ to be recorded on the overscan or audio recording section of each track $T_A$ and $T_B$ as an encoded compressed audio signal $S_{po}$. In particular, RAM processing circuit 9 mixes the PCM encoded audio signal $S_p'$ corresponding to the video signal $S_{vo}$ recorded on the leading portion of the preceeding track and the video signal $S_{vo}$ recorded on the trailing portion of the preceeding alternate track, as previously discussed. RAM processing circuit 9 also compresses the block of the encoded audio signal $S_p'$ with respect to time and, in some circumstances, as will be discussed in greater detail hereinafter, performs an interleaving operation with respect to the audio signal.

In some situations, it may be desirable to provide a frequency shift key (FSK) circuit 10 for frequency modulating the PCM encoded signal $S_p'$ from RAM processing circuit 9 to produce a frequency modulated audio signal $S_p''$. For example, FSK circuit 10 may include first and second oscillators which generate oscillation signals having frequencies $f_1$ and $f_2$, respectively, and a switching circuit coupled to RAM processing circuit 9 for selecting the oscillation signal generated by one of the oscillators in response to the digitized audio signal supplied thereto. For example, the switching circuit may be responsive to each logic level "0" portion of the digitized audio signal to select the first oscillation signal having a frequency $f_1$, and responsive to each logic level "1" portion of the digitized audio signal to select the oscillation signal having a frequency $f_2$. As a result, FSK circuit 10 may be thought of as modulating logic level "0" portions of the PCM audio signal $S_p'$ with the oscillation signal having a frequency $f_1$ and modulating logic level "1" portions with the oscillation signal having a frequency $f_2$.

The output from FSK circuit 10 is coupled to input contacts P of change-over switch circuits 11 and 12, while the video signal $S_v$ is supplied from an input terminal 6 to input contacts V of switch circuits 11 and 12. Each of switch circuits 11 and 12 includes a movable arm which switches either the audio signal $S_p''$ from FSK circuit 10 or the video signal $S_v$ from input terminal 6 to rotary magnetic heads A and B through recording amplifiers 15 and 16, respectively, in accordance with the timing charts shown in FIGS. 5A and 5B, thereby to record the audio and video signals in successive parallel tracks on magnetic tape 2. Each change-over switch circuit 11 and 12 is responsive to a switch control signal supplied thereto so as to couple its input contact P or its input contact V to the respective recording amplifier 15 or 16. For example, each change-over switch circuit 11 and 12 is adapted to couple its input contact P to the output terminal thereof in response to a positive pulse level (audio signal switch pulse) and to couple its input contact V to the output thereof in the absence of this positive pulse level, that is, in response to a negative or zero pulse level.

Figure 6:
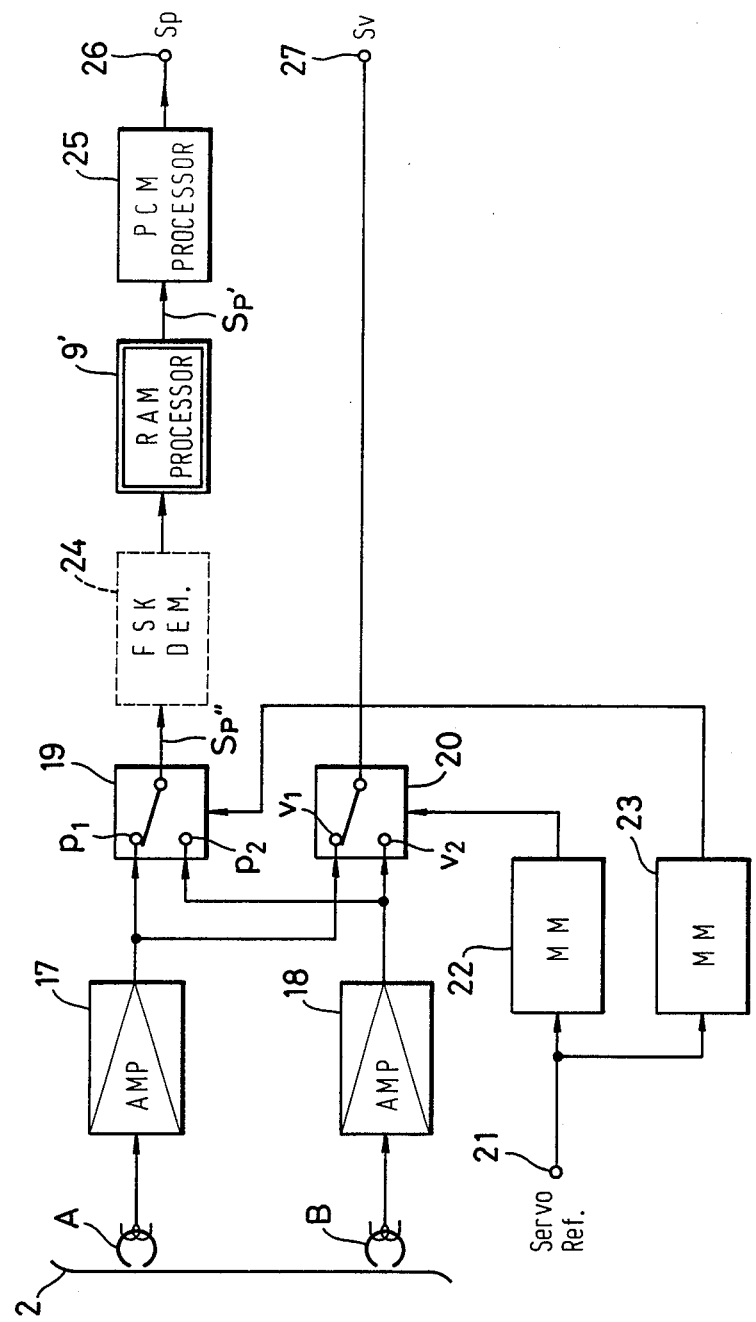
FIG. 6 is a block diagram of a reproducing section of an information signal recording and reproducing apparatus according to one embodiment of the present invention.

A pulse generator such as a monostable multivibrator 13 is adapted to supply a change-over pulse to change-over switch circuit 11, and a similar pulse generator, such as a monostable multivibrator 14, is adapted to supply a change-over pulse to change-over switch circuit 12. Monostable multivibrators are each connected to an input terminal 7 adapted to receive a servo reference signal SERVO REF supplied thereto from RAM processing circuit 9 and, in particular, the SERVO REF signal is a pulse signal formed by a field counter 32 contained in RAM processing circuit 9 in the recording section (FIG. 4) and RAM processing circuit 9' in the reproducing section (FIG. 6). Thus, monostable multivibrators 13 and 14 may be triggered to produce an audio signal switch pulse of predetermined duration, corresponding to the rotation of each head A and B between positions c and d, as shown in FIGS. 5A and 5B, when the respective heads are recording the audio signal $S_p''$ in respective ones of the tracks. During travel of the heads between positions d and e, video signals are supplied through contacts V to the A and B heads, respectively. Monostable multivibrator 14 may include a suitable delay circuit or may be series-connected with monostable multivibrator 13 so as to produce a delayed output pulse relative to the output of monostable multivibrator 13 and corresponding to a time when magnetic head B rotates to position c.

Referring now to FIG. 6, a reproducing section according to the present invention and complementary to the recording section of FIG. 4 for reproducing signals that are recorded on adjacent tracks $T_A$ and $T_B$ of tape 2 is shown. It is to be appreciated that rotary magnetic heads A and B previously used in the recording section of FIG. 4 to record the signals on successive parallel tracks of magnetic tape 2 can also be used for reproducing the signals from such successive parallel tracks in the reproducing section of FIG. 6, although separate reproducing heads may also be used. Rotary magnetic head A is coupled to contacts $P_1$ and $V_1$ of change-over switch circuits 19 and 20, respectively, through an amplifier 17. In like manner, rotary magnetic head B is connected to contacts $P_2$ and $V_2$ of switch circuits 19 and 20, respectively, through an amplifier 18. Change-over switch circuits 19 and 20 are therefore controlled by switch pulses supplied from monostable multivibrators 23 and 22, respectively, in accordance with the timing charts of FIGS. 5A and 5B. As illustrated, monostable multivibrators 22 and 23 are triggered in response to a servo reference signal SERVO REF supplied thereto from an input terminal 21. During operation, switch circuits 19 and 20 are controlled so that reproduced audio signals are supplied to contacts $P_1$ and $P_2$ when the A and B heads scan the respective tracks $T_A$ and $T_B$ between points c and d shown in FIG. 1, and so that reproduced video signals are supplied to contacts $V_1$ and $V_2$ when the A and B heads scan the respective tracks $T_A$ and $T_B$ between points d and e shown in FIG. 1. Thus, when head A rotates to position c, monostable multivibrator 23 supplies a switch pulse to change-over switch circuit 19 such that audio contact $p_1$ is connected to the output of switch circuit 19. Accordingly, the PCM audio signal $S_p''$ from head A is supplied to the audio signal processing section of the circuit to derive the audio signal $S_p$ therefrom. At this time, monostable multivibrator 22 controls switch circuit 20 to couple video contact $V_2$ to the output of switch circuit 20, and thereby, to output terminal 27 of the reproducing circuit of FIG. 6. Accordingly, the video signal reproduced from track $T_B$ by head B is supplied to output terminal 27.

When head A rotates to position d and head B thereby rotates to position e of the respective tracks $T_A$ and $T_B$, monostable multivibrators control switch circuits 19 and 20 to connect respective input contacts $P_2$ and $V_1$ to the outputs thereof. At this time, however, head B is not in contact with tape 2 so that no signals are supplied to contact $P_2$ of switch circuit 19, while the video signal reproduced by head A is supplied through switch circuit 20 to terminal 27. When rotary magnetic head B rotates to position c, the PCM audio signals reproduced thereby are supplied through contact $P_2$ of switch circuit 19 to the audio processing section of the circuit, while the video signal reproduced by head A is still supplied through switch circuit 20 to terminal 27. When head B rotates to position d of a respective track $T_B$, monostable multivibrators 22 and 23 control switch circuits 19 and 20 to connect input contacts $P_1$ and $V_2$ to the outputs thereof. Therefore, as magnetic head B reproduces the video signal from a track $T_B$, this video signal is coupled via change-over switch circuit 20 to video output terminal 27. The foregoing operation continues such that the respective change-over switch circuits 19 and 20 are operating alternately, thereby separating the audio and video information signals that are reproduced from successive tracks $T_A$ and $T_B$.

The separated FSK modulated PCM audio signal $S_p''$ is supplied from switch circuit 19 to an FSK or FM demodulation circuit 24 which frequency demodulates the frequency-modulated PCM audio signal $S_p''$ with a characteristic which is complementary to that imparted by FSK modulation circuit 10 of FIG. 4. The PCM audio signal from FSK demodulation circuit 24 is supplied to a RAM processing circuit 9' which processes the PCM audio signal supplied thereto in a complementary manner to the characteristic imparted by RAM processing circuit 9 of the recording section of FIG. 4 to thereby produce PCM audio signal $S_p'$. In particular, RAM processing circuit 9' expands the time base of the PCM audio signal supplied thereto and de-interleaves the signal if an interleaving characteristic has been imparted thereto. The PCM audio signal $S_p'$ from RAM processing circuit 9' is then supplied to a PCM processing circuit 25 which, in response thereto, produces the original analog audio signal $S_p$ at an output terminal 26 thereof. PCM processing circuit 25 preferably includes a PCM decoding circuit which provides a characteristic complementary to PCM encoding circuit 8b and a digital-to-analog (D/A) converting circuit which returns the digitized audio signal to analog form to thereby produce the analog audio signal $S_p$ at output terminal 26.

Figure 7:
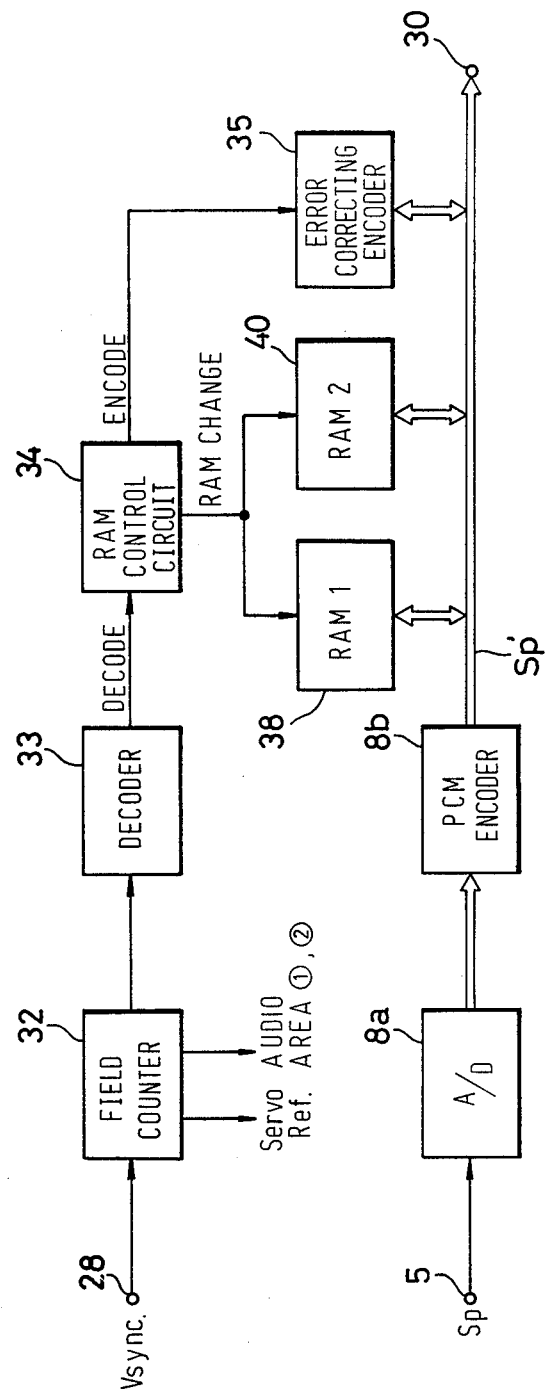
FIG. 7 is a block diagram of a RAM processing circuit that can be used with the recording and reproducing sections of FIGS. 4 and 6, respectively.
Figure 8:
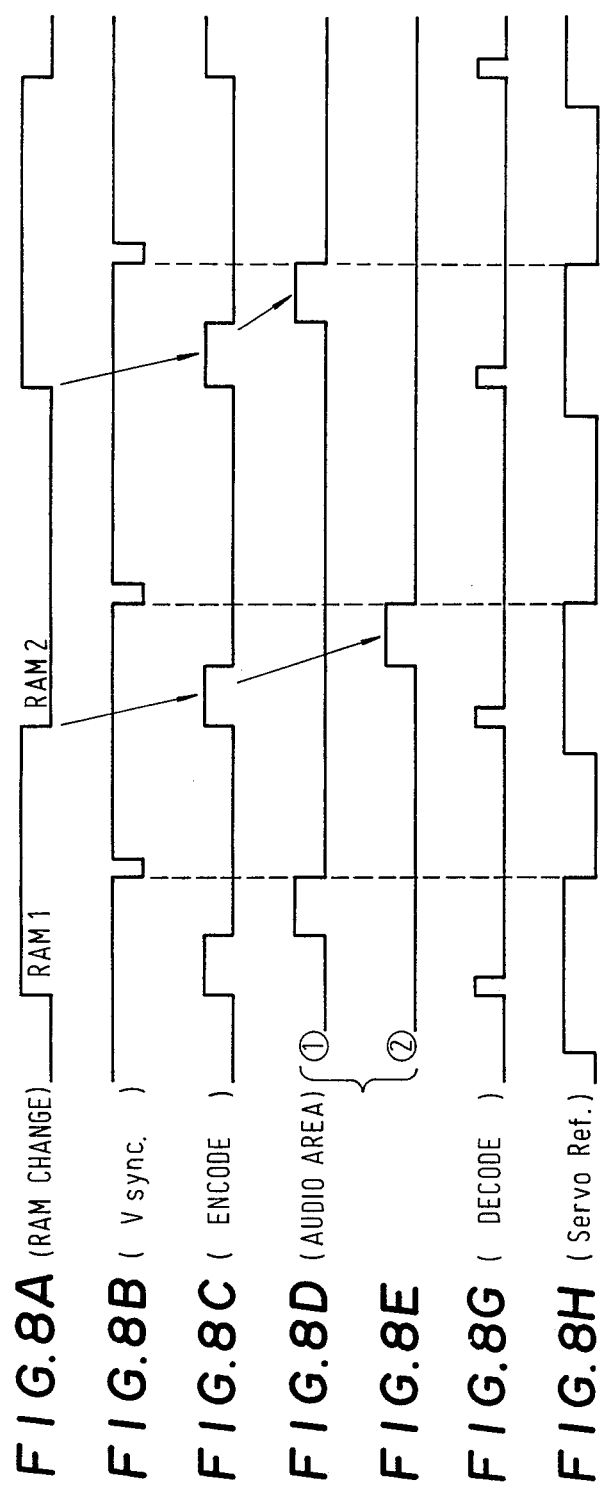
FIGS. 8A-8H are timing charts used for explaining the operation of the RAM processing circuit of FIG. 7.

Referring now to FIG. 7, a RAM processing circuit 9 according to one embodiment of this invention includes a field counter 32 which is reset by the vertical synchronizing signal $V_{sync}$ (FIG. 8B) of the video information signal supplied from an input terminal 28. In response thereto, field counter 32 produces the aforementioned servo reference signal SERVO REF (FIG. 8H) and audio area signals AUDIO AREA 1 and AUDIO AREA 2 (Figs. 8D and 8E) which correspond to the timing for recording the audio signals on tracks $T_A$ and $T_B$, respectively.

Field counter 32 also supplies a signal to a decoder circuit 33 which, in response thereto, supplies an output signal DECODE (FIG. 8G) to a RAM control circuit 34 for controlling the reading and writing of audio signals $S_p$ from an input terminal 5 from or into a first RAM 38 or a second RAM 40. In particular, in response to output signal DECODE, RAM control circuit 34 supplies an output signal RAM CHANGE to first and second random access memories (RAMS) 38 and 40. Accordingly, when RAM CHANGE signal (FIG. 8A) is at logic level "1", RAM 38 performs a write operation with respect to a block of the encoded PCM audio signal $S_p'$ corresponding to the video signal recorded in the leading portion of a previous track and the video signal recorded in the trailing portion of the previous alternate track. For example, for the audio signal $S_{po}$ to be recorded at the beginning of track $T_{A2}$, the audio signal $S_p'$ from PCM encoding circuit 8b and corresponding to the video signal in the leading portion of the preceding track $T_{B1}$ and the trailing portion of the preceding alternate track $T_{A1}$, is written into RAM 38. Contrary thereto, when RAM CHANGE signal is at logic level "0", RAM 40 performs the aforementioned write operation, for example, with respect to the audio signal $S_{po}$ to be recorded in the next track $T_{B2}$.

When the RAM CHANGE signal is at logic level "0", RAM 38 performs a reading operation with respect to the audio signal stored therein. In like manner, when RAM CHANGE signal is at logic level "1", RAM 40 performs a reading operation. In other words, while one of RAMS 38 and 40 is performing a write operation with respect to the audio signal $S_p'$, the other of RAMS 38 and 40 is performing a read operation with respect to the audio signal $S_p'$ stored therein.

The signals read out from RAMS 38 and 40 are supplied to an error correcting encoder 35 which encodes the PCM audio signal $S_p'$ and adds error correction codes thereto at a time when an encode signal ENCODE (FIG. 8C) from RAM control circuit 34 is at logic level "1". Thereafter, the encoded audio signal from error correcting encoder 35 is supplied back to the respective RAM 38 or 40. It is to be appreciated that this encoding time period corresponds to the coding period shown in FIG. 3. Thus, the timing of decode signal DECODE from decoder 33 is determined by the total time required by error correcting encoder 35 to encode the audio signal $S_p'$ during the coding period and the time required for recording the audio signal $S_{po}$ in the overscan or audio section of the respective track $T_A$ or $T_B$, that is, corresponding to the audio separation point of FIG. 3. Thereafter, when the respective audio area signal AUDIO AREA 1 or AUDIO AREA 2, shown in FIGS. 8D and 8E, respectively, is at logic level "1", the encoded audio signal which had been read back into the respective RAM 38 or 40 is read out in compressed form by reading the audio signal $S_p'$ out at a faster rate than it was written in the respective RAM, and then supplied, for example, through an output terminal 30 to FSK modulation circuit 10 in the recording section of FIG. 4, to be recorded in the overscan or audio section of the respective track. It is to be appreciated that the compression may result from signals other than the RAM CHANGE signal supplied to RAMS 38 and 40, such as signals AUDIO AREA 1 and AUDIO AREA 2. Thus, while RAM 38(40) performs the write operation, RAM 40(38) encodes and compresses the audio signal $S_p'$ with respect to time and thereafter reads such encoded and compressed audio signal out to FSK modulation circuit 10.

Figure 9:
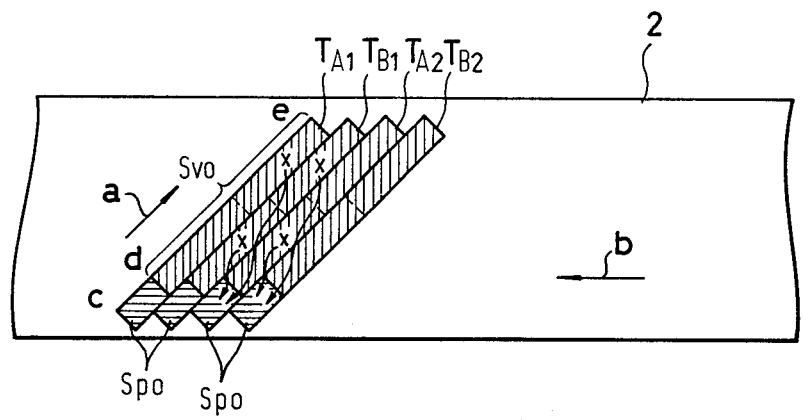
FIG. 9 is a schematic plan view of the section of magnetic tape showing an arrangement of tracks in which the video and audio signals are recorded in accordance with one embodiment of the present invention and illustrating the maximum 1.5 field interval delay relationship between correspondingly recorded audio and video signals.

In this manner, the audio signal $S_p''$ from FSK modulation circuit 10 is recorded in the audio or overscan sections of each track $T_A$ and $T_B$ as a recorded audio signal $S_{po}$. As stated previously, in accordance with the present invention, the recorded audio signal $S_{po}$ corresponds to the equivalent field time interval of video signal $S_{vo}$ as recorded in the leading portion of the previous adjacent track and in the trailing portion of the previous alternate track. For example, as shown in FIG. 9, the audio signal $S_{po}$ recorded in track $T_{A2}$ corresponds to the equivalent field time interval of the video signal recorded in the leading portion of the previous adjacent track $T_{B1}$ and the video signal recorded in the trailing portion of the previous alternate track $T_{A1}$.

Figures 10A, 10B:
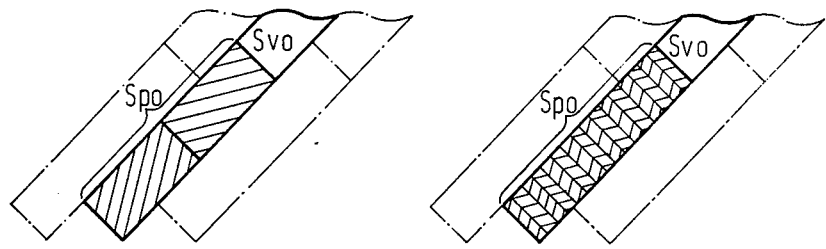
FIGS. 10A and 10B are schematic plan views of the overscan section of the tracks of FIG. 9 for illustrating different ways that the audio signal can be recorded in accordance with the present invention.

In accordance with another aspect of this invention, the audio signal $S_{po}$ recorded, for example, in the overscan or audio section of track $T_{A2}$, can be recorded as shown in FIG. 10A or FIG. 10B. In FIG. 10A, that portion of the recorded audio signal $S_{po}$ corresponding to the video signal recorded in the trailing portion of track $T_{A1}$ is first recorded in a leading portion of the overscan section and that portion of the recorded audio signal $S_{po}$ corresponding to the video signal recorded in the leading portion of track $T_{B1}$ is recorded in the trailing portion of the overscan or audio section of track $T_{A2}$. Alternatively, as shown in FIG. 10B, the audio signal $S_{PO}$ corresponding to the video signal recorded in the trailing portion of track $T_{A1}$ can be interleaved with the audio signal $S_{po}$ corresponding to the video signal recorded in the leading portion of track $T_{B1}$. The interleaving or interlacing operation may be performed for every sample of the respective audio signal or for every group of samples. It is to be appreciated that the interlaced recording operation of FIG. 10B is advantageous to that of FIG. 10A because the audio signal reproduced from each track may not be significantly degraded even if drop-out results during the initial period of contact between the respective rotary magnetic heads A and B and tape 2. In other words, drop-out of the reproduced audio signal is scattered by the interleaved recording of FIG. 10B so as to prevent any large concentration of drop-out at any given point. It is to be appreciated that the latter interleaving function can be easily provided, for example, by separating each RAM 38 and 40 into two sections and, upon reading out the signals therefrom, reading each sample or group of samples alternately from the two sections of the respective RAM 38 or 40, with such operation being controlled by RAM control circuit 34 or other means.

During the reproduction operation, the audio signal $S_p'$ from FSK demodulation circuit 24 is supplied to RAM processor 9' which is complementary to RAM processor 9 of FIG. 7. In particular, RAM processor 9' can be identical to RAM processor 9 with the exception that an error correcting decoder is substituted for error correcting encoder 35, a PCM decoder is substituted for PCM encoder 8b and a D/A circuit is substituted for A/D circuit 8a. Thus, during reproduction, the audio signal $S_p'$ from FSK demodulation circuit 24 is supplied to the error correcting decoder which decodes the reproduced signal $S_p'$ on the basis of the error correction codes added thereto and writes the error corrected audio signal alternately for each track into RAMS 38 and 40 during alternate field intervals. As previously discussed, while one of RAMS 38 and 40 performs a write operation, the other RAM 38 performs a read operation. It is to be appreciated that, during the read operation, a time base expansion operation is performed and, if the PCM audio signal has been interleaved, such signal is de-interleaved. The expanded audio signal $S_p'$ from RAMS 38 and 40 are supplied to PCM processing circuit 25 which, as previously discussed, includes a PCM decoder and a D/A circuit and which produces an analog audio signal $S_p$ at output terminal 26. The operation of the remainder of RAM processing circuit 9 shown in FIG. 7 can be identical to the circuitry in RAM processing circuit 9', and accordingly, a detailed description thereof will be omitted herein for the sake of brevity. However, by use of the same circuitry, simplicity in the circuit design and operation is achieved. For example, the same field counter 32, decoder 33, RAM control circuit 34 and RAMS 38 and 40 can be used with RAM processing circuit 9'.

It is to be appreciated that, while the audio signal $S_{po}$ has been described as being recorded at the leading end of each track $T_A$ and $T_B$, such audio signal $S_{po}$ may be recorded at the trailing end of each track $T_A$ and $T_B$ to obtain the same result. In particular, this latter method of recording may be preferable if a considerable length of time is required to encode the audio signal $S_p$. In such case, if, for example, the audio signal $S_{po}$ is recorded at the trailing end of track $T_{B1}$, such audio signal $S_{po}$ corresponds to the same video signal recorded at the trailing portion of the previous adjacent track $T_{A1}$ and the video signal recorded at the leading portion of the same track $T_{B1}$. However, in the preferred embodiment of the present invention, the audio signal $S_{po}$ is preferably recorded at the leading end of each track on magnetic tape 2, corresponding to the initial period of contact between the heads and tape 2, rather than the trailing end thereof, in order to improve the recording/reproducing characteristics of the audio signal $S_p$.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for recording an information signal formed of a video signal and an audio signal in a plurality of successive tracks on a record medium, each track being divided into at least two sections, the apparatus comprising:
   means for converting the audio signal into a coded digital audio signal;
   means for time base compressing the digital audio signal; and
   means for recording the compressed digital audio signal and said video signal in said plurality of tracks such that in each track one section has said compressed digital audio signal recorded therein and another section has the video signal recorded therein, characterized in that control means are provided so that one field of a selected video signal is recorded in one of said sections of each track, said one of said sections of each track being formed of a leading portion of one video field and a trailing portion of the same video field, and a portion of said compressed digital audio signal having a length in real time base equivalent to one video field interval of said video signal that is prior to the selected video signal on a real time base axis is recorded in another section of each track, said compressed digital audio signal corresponds to the video signal formed of a trailing portion of one video field and a leading portion of a next successive video field, and said recorded audio signal is separated from the recorded video signal portions to which it corresponds by a predetermined interval including a digital coding duration imparted by said means for converting, such that said compressed digital audio signal recorded in said another section of each track corresponds on a real time base axis to a prior video signal recorded in a trailing portion of the next but one preceding successive track and to a prior video signal recorded in a leading portion of the next preceding successive track.

2. Apparatus according to claim 1, in which said means for compressing includes memory means for storing said digitized audio signal and said control means is connected for controlling said memory means to write said digitized audio signal therein at a first rate and to read such digitized audio signal therefrom at a second, faster rate, thereby compressing said digitized audio signal.

3. Apparatus according to claim 2, in which said video signal includes a vertical synchronizing signal and said memory means includes a first memory device and a second memory device and in which said control means includes a field counter receiving said vertical synchronizing signals of said video signal for producing an output therefrom, and a decoder circuit receiving said output from said field counter and producing a decode signal therefrom for controlling said first memory device and said second memory device to alternately write and read one block of said audio signal corresponding to a real time length equivalent to one field interval of the video signal.

4. Apparatus according to claim 1, further comprising FSK modulation means for frequency modulating said compressed digital audio signal to produce a frequency modulated, compressed, digital audio signal and supplying same to said means for recording.

5. Apparatus according to claim 1, in which said means for recording includes at least one recording head and in which said video signal includes a vertical synchronization signal; and said apparatus further includes counter means for producing a reference signal in response to said vertical synchronization signal, and switch means for switching said compressed digital audio signal and said video signal to said at least one recording head and switch control means for controlling operation of said switch means in response to said reference signal applied thereto.

6. Apparatus according to claim 5, in which said means for recording further includes first and second recording heads and said switch means includes first and second switch devices for switching said compressed digital audio signal and said video signal to said first and second recording heads, respectively.

7. Apparatus according to claim 6, in which said switch control means includes first and second multivibrator means for controlling operation of said first and second switch means, respectively, in response to said reference signal, whereby said compressed digital audio signal, corresponding on a real time base axis to one field interval of said video signal, and one field interval of said video signal are switched by said first switch means to said first recording head during alternate field intervals and are switched by said second switch means to said second recording head during remaining ones of said alternate field intervals.

8. Apparatus according to claim 7, in which said video signal includes a vertical synchronizing signal, and said apparatus further includes counter means for producing said reference signal in response to said vertical synchronizing signal.

9. A method for recording an information signal formed of a video signal and an audio signal in a plurality of successive tracks on a record medium, each track being divided into at least two sections, comprising the steps of:

converting the audio signal into a coded digital audio signal;

time base compressing the coded, digital audio signal; and recording the compressed digital audio signal and said video signal in said plurality of successive tracks, such that in each track one section has said compressed digital audio signal recorded therein and another section has the video signal recorded therein, the step of recording being characterized by recording one field of a selected video signal having a length equivalent to one video field interval in one of said sections of each track and recording a selected portion of said compressed digital audio signal having a length in real time base equivalent to one field interval of the video signal that is prior to the selected video signal on a real time base axis in another section of the track and in which said step of recording said audio signal includes the step of selecting said audio portion to correspond to the video signal recorded in a leading portion of a next preceding track and recorded in a trailing portion of a next but one preceding track, such that a beginning of said audio portion is delayed from the beginning of the selected video signal to which it corresponds by a predetermined interval including a digital coding interval imparted during the step of converting, such that the compressed digital audio signal recorded in said another section in each track corresponds on a real time base axis to the prior video signal recorded in the trailing portion of the next but one preceding successive track and to the prior video signal recorded in the leading portion of the next preceding successive track.

10. A method according to claim 9, in which said step of time base compressing includes the steps of writing said digitized audio signal into a memory at a first rate and reading said digitized audio signal from said memory at a second, faster rate.

11. A method according to claim 10, in which said step of writing includes the step of writing said digital audio signal corresponding to one field interval of said video signal into a first memory device at said first rate during alternate field intervals and writing into a second memory device at said first rate during the remaining field intervals; and in which step of reading includes the step of reading said digital audio signal from said first memory device at said second, faster rate during said remaining field intervals and from said second memory device at said second, faster rate during said alternate field intervals.

12. A method according to claim 9, further including the step of frequency modulating said compressed digital audio signal prior to recording same in said plurality of successive tracks.

* * * * *